United States Patent [19]

Marcadet et al.

[11] Patent Number: 4,545,560
[45] Date of Patent: Oct. 8, 1985

[54] VALVE COUPLING

[75] Inventors: Luc Marcadet, Noyers sur Cher; Michel Ozanne, Proussy, both of France

[73] Assignee: Dresser Industries, Inc., Dallas, Tex.

[21] Appl. No.: 474,763

[22] Filed: Mar. 14, 1983

[30] Foreign Application Priority Data

Mar. 24, 1982 [FR] France ................................ 82 05024

[51] Int. Cl.$^4$ ...................... F16K 31/124; F16K 37/00
[52] U.S. Cl. ......................................... 251/58; 91/387; 251/229; 137/556
[58] Field of Search ..................... 251/58, 229; 91/386, 91/387; 137/556

[56] References Cited

U.S. PATENT DOCUMENTS

| 2,588,988 | 3/1952 | Robins | 91/387 |
| 2,601,511 | 6/1952 | Gaffney | 91/387 |
| 2,811,138 | 10/1957 | Clements | 91/387 |
| 3,209,656 | 10/1965 | Thieme | 91/387 |
| 3,222,995 | 12/1965 | Reed | 91/387 |
| 3,222,996 | 12/1965 | Thieme et al. | 91/387 |

Primary Examiner—George L. Walton
Attorney, Agent, or Firm—Daniel Rubin

[57] ABSTRACT

The invention is directed to a process for establishing a coupling with adjustable reduction ratio between a first driving rotation motion (r1) around a first fixed axis (10) and a receiving translation motion. The invention is also directed to a coupling device (1) that activates the receiving translation motion (f2) by mechanically coupling it with a second rotation motion (r2), called receiving motion, around a fixed axis (21) and establishing an adjustable mechanical correlation between the said driving (r1) and receiving (r2) rotation motions.

The invention refers also to apparatus for the regulation of the amplitude of a parameter, and more particularly to valves (30) for the regulation of the flow rate of a fluid, whose nominal flow rate factor is steplessly adjustable, and which uses the abovedefined process and coupling device.

5 Claims, 5 Drawing Figures

VALVE COUPLING

BACKGROUND OF THE INVENTION

The present invention relates to automatic control devices for the adjustment of a physical parameter. We provide a process and an apparatus of mechanical coupling between the servomotor (actuating a driving rod having a linear motion) and a regulating valve (similarly actuated by a driven rod having a linear motion) of a device for the adjustment of the amplitude of a physical parameter.

The purpose of this coupling apparatus is to ensure a continuous adjustment, over a wide band, of the variation range of the parameter regulated by the said device and, more especially, of the nominal parameter of said range (i.e. of the maximum value of the regulated parameter), in accordance with the imposed working conditions.

Most mechanical regulating devices for the adjustment of a parameter comprise essentially a regulating system (or regulating valve) acting on the variation of the amplitude of the parameter and a servomotor for controlling the position of the said regulating valve, the said servomotor being actuated by means of an auxiliary power source such as pressurized air, pressurized oil, or electricity.

The regulation of the parameter is correlated with a control signal emitted by a regulator and transmitted to the servomotor.

The regulating apparatus is provided with a servo-system called positioner whose aim is to ensure the correlation between the control signal and the state of the regulating system. This is provided because usually the power of the control signal is insufficient for controlling the servomotor directly, and, for ensuring a great accuracy of the action of the servomotor in consideration of the level of the control signal. As any automatic servo-system, this servo-system conventionally comprises a reception device of the control signal emitted by the regulator; a perception device of the position of the regulating valve, in mechanical or analog form; a comparison device between a desired state of the regulation system, resulting (especially through a cam system) of the application to the control signal of a linear or non-linear operator and the actual state of the regulation system; and, finally, a power amplifier feeding the servomotor with auxiliary power, and whose action is controlled by the comparison device for reducing the discrepancy between the desired state and the actual state of the regulating system.

The most common and most advantageous application of this type of regulating apparatus, and more especially of the coupling device according to the present invention, is the fluid flow rate regulating valve which, therefore, will be taken as an example for the description of the invention although this should not be interpreted as limiting the scope of the invention.

In this application, the regulated parameter is the flow rate factor (hereinafter designated by FRF) of the valve connecting two parts of the piping through which flows a fluid.

Basically, the FRF of a valve is the number of U.S. gallons of water flowing through this valve in one minute when the pressure drop in the valve is one psi. It is therefore obvious that the FRF of a valve is a good representation of the restriction to the flow of a fluid which a valve opposes instantaneously.

In the course of this description a particular attention will be paid to valves whose regulation system is of the linear motion type, i.e. whose valve body connecting both ends of the piping comprises a transversal recess which houses a linearly guided assembly (seat and trap-valve) operated from the outside by the said driven rod.

The servomotor of these valves is usually of the pneumatic type (i.e. whose auxiliary power is produced by the pressure of a gas) and comprises a piston topped by the driving rod and lodged inside a cylindrical chamber against a membrane integrating the pressure action of the volume of gas introduced and confined in this chamber.

Finally, a coupling device made up of a more or less complicated system of levers ensures the transmission and amplification of the movement of the driving rod of the servo-motor to the driven rod of the variable obturation system.

This type of valve is at present widely used and appreciated in all industrial fields for effecting the automatic regulating of the rate of flow of fluids. It is not uncommon that one and the same plant uses several hundred valves effecting the regulation of the rate of flow of fluids of diverse types according to very different flow rate factors. However, this variety of service conditions (and of corresponding FRFs) raises many adaptation problems of the regulating valves for supplying, in each case, a valve with a nominal flow rate factor (i.e. a maximum FRF) exceeding as least as possible the computed working FRF.

This constraint in the adjustment of the nominal flow rate factor is imposed, on account of safety, in many fields such as the chemical one. As a matter of fact, it is obvious that a mechanical failure of a valve and especially of its servomotor may bring about a maximum opening of the obturation system of the valve; lead to chain incidents in the circuitry of the plant if the descrepancy between nominal flow rate and working flow rate is too great, and therefore result in serious accidents such as explosion or pollution.

Several methods are known at present for adapting the nominal flow rate factor of a valve to a predetermined FRF.

The simplest method consists in constructing a different valve for each case of application by homothetical reproduction of one of these valves. But this solution obviously leads to designing and manufacturing costs inconsistent with the present industrial constraints as each component of the valve must be manufactured individually.

A variant of this solution consists in reducing the stroke of the trap or poppet by altering the proper scale of the servomotor if the latter is not equipped with a positioner. This, however, leads to the same cost drawbacks as before.

Another variant, which is the most widely used solution at the present time, consists in providing, for the equipment of the valve body, a more or less comprehensive range of sets of variable obturation systems of the rate of flow (trap+seat).

The drawback of this solution is also its high cost price as such obturation systems are complicated components needing a very accurate machining and which would be more advantageously manufactured in mass production. Beside this, many applications need accurate differences between the working FRF and the nominal FRF of each valve. It is not uncommon, in particular, that the condition imposed to each valve of the installation is such as $$\frac{\text{nominal } FRF - \text{working } FRF}{\text{nominal } FRF} < 20\%.$$

In such a case, the valve manufacturer, wishing (on grounds of cost and homogeneity of equipment to facilitate its maintenance) to equip the installation with one and the same type of valve, must keep in stock a range of obturation systems whose nominal FRFs are distributed according to a series of 1.2 geometrical ratio.

These conditions currently result in imposing a range of several hundred obturation systems for the equipment of one and the same plant.

Moreover, this latter solution, if adhered to by the manufacturer, also offers the drawback of being rigid and excluding the possibility of a fine and stepless adjustment of the range of nominal FRFs to particular conditions.

A second method, applicable mainly when the valves considered are equipped with positioners, consists in varying the feed-back scale of the positioner. As a matter of fact, the principle of working of a pneumatic positioner rests on the equilibrium of two forces the one exerted on a diaphragm by the pressure of the pneumatic signal from the output of the regulator and the other produced by the tension of a reaction spring whose length is related to the position of the servomotor rod, and therefore of the trap, through a reaction mechanism.

Consequently, the most common variants of this method consist either in using reaction springs of different stiffnesses, or in altering the kinematics of the movements between the reaction spring and the servomotor rod.

Contrary to the preceding methods, this solution offers the advantage of being simple and cheap and of permitting a stepless adaptation of the nominal FRF corresponding to the maximum signal. It has, however, two major drawbacks due to the facts that on the one hand, it is bound to the use of a positioner whose amplifying action of the signal is modified by the use of this solution, and, on the other hand, it is attended by great risks in the field of the safety of the installations as the nominal FRF of the corresponding valves is no more bound to a mechanical abutment (the extreme position of the servo-motor rod) but only to the extreme state of the control signal.

The second drawback practically excludes the application of this solution in all installations with a high safety-factor.

Finally, the applicant of the present Patent Application developed, in the past, a valve type whose nominal flow rate factor can be steplessly adjusted mechanically. The main purpose of this valve is to solve the difficult problem of the regulation of very low fluid flow rates under a very high pressure.

To achieve this purpose, that valve essentially comprises a frame having an axis of rotation; a primary lever hinged by one of its ends to the said rotation axis; an intergrated positioner-servomotor assembly, integral with the said frame and placed perpendicularly to the mean position of the primary lever, adjacent to its second end, and connected to the said second end by an axial driving rod in translation along a so-called first axis (of translation) perpendicular to the rotation axis; a secondary lever in the shape of a transmission rod hinged, (by one of its ends called upstream end), to a guiding saddle introduced inside a groove provided adjacent to the first end of the primary lever in a plane perpendicular to the axis of rotation, this saddle having besides a drilled-through longitudinal slot cooperating with a locking nut integral with the primary lever so that the position of the so-called upstream end of the secondary lever may be displaced and then locked in front of the corresponding end of the primary lever, and similarly hinged by its other end (called downstream end), in front of a secondary driven rod guided in translation along a so-called second axis of translation (intersecting the rotation axis, and perpendicular to the said rotation axis and to the first axis of translation) and actuating, by its movement, the trap of the valve located on its extension.

It is obvious that such a valve offers the following advantages, it may be switched from the "no-air opening type" to the "no-air closing type" by a mere displacement of the saddle inside its groove on both sides of the neutral position represented by the said second axis of translation; it allows a stepless adjustment of its nominal flow rate factor by altering the distance between the upstream end of the secondary lever and the neutral position; and finally it is very appropriate to the regulation of fluids under very high pressure as a consequence of the high reduction ratio between the driving (of the servo-motor) and driven (of the trap) translation movements which is offered by the orthogonal transmission coupling system formed by the primary and secondary levers coupled by two of their ends and mounted perpendicularly to the axis of the positioner, in extension to the axis of the trap.

However, the use of that type of valve is not widespread first of all because of the very high cost price of the coupling system due, in particular, to the difficulty of an accurate machining of the groove and saddle, and of the knee-joint-like hinges between the saddle, the secondary lever and the secondary rod, and to the very peculiar structure of this coupling system which forbids its adaptability to conventional valves.

Other disadvantages were the sharpness of adjustment of the FRF caused by the high reduction ratio and by the somwhat inadequate system of positioning of the saddle, and its very high space requirement as a consequence of the massive form of its two levers and of the arrangment of its auxiliary units (positioner and servomotor on the one hand, and flow rate regulating system on the other hand) according two orthogonal directions.

The present invention has for its general purpose to offer a relatively inexpensive means of using one and the same apparatus for the regulation of the amplitude of a parameter in a very wide field of application by permitting the adjustment of its nominal parameter to each of the imposed conditions of service.

Another object of the invention is to offer such a means of adjusting the nominal parameter of a regulating apparatus which solves the above-mentioned problems proceeding from the structure of the existing devices and which is simple, non-bulky, and easily adaptable to the majority of the existing regulating devices.

Still another object of the invention is to disclose a variant of such a means of adjustment of the nominal parameter of a regulating apparatus whose implementation is simple, rapid, continous and accurate.

A further object of the invention is to recommend several configurations of the means proposed which ensure, within a wide range of application, a quasi-linearity between the signal transmitted to the regulating apparatus and the action of this apparatus on the amplitude of the regulated parameter.

Still further the present invention is to describe, according to the principles set forth hereafter, a new idea of a fluid flow rate regulating valve with a stepless adjustment of its nominal flow rate factor, which is simple, non-bulky, accurate, and very reliable as regards the safety level.

With these aims and objects in view, the invention refers mainly to a process of mechanical coupling with adjustable reduction ratio between a rotary (or "driving") motion around a first fixed axis and a translation (or "receiving") motion.

This process is remarkable by the fact that on the one hand, the said receiving translation motion is activated, from the driving rotary motion, by coupling it mechanically with a second rotary (or "receiving") motion around a second fixed axis, and, on the other hand, an adjustable kinematic correlation is established between the driving and receiving rotary motions.

As a matter of fact, this process is appropriate to a very advantageous application for effecting a mechanical coupling according to a reduction ratio adaptable between two translation motions respectively called driving and receiving motions. This variant consists in controlling the driving rotary motion by coupling it mechanically with the driving translation motion.

It is easily understood that such a process enables to carry out, in an apparatus for the regulation of the amplitude of a parameter, a mechanical coupling between the servomotor imparting a translation motion to a driving rod, guided along a first axis, and the operative means of the said apparatus on the amplitude of the parameter, the said means being actuated by a receiving rod guided along a second axis.

It is also understood that, according to the selection of the mechanical correlation between the driving and receiving rotary motions, this process enables carrying out the adaptation of the kinematic reduction ratio of the coupling (i.e. the regulation range of the apparatus) over a wide band.

Besides this, the invention also refers to a device suitable for the application of a process such as the above-mentioned one for effecting a mechanical coupling with adjustable reduction ratio between a first driving rotary motion around a first fixed axis and a receiving translation motion.

Such a device comprises a first driving lever rotating around a first fixed axis for embodying the first driving rotary motion, a second receiving lever rotating around a second axis parallel to the first axis, and a receiving rod guided by and hinged to the said second lever for embodying the receiving translation motion. According to the invention, the second rotation axis is fixed, and the first and second levers are coupled together by a coupling means (e.g. an auxiliary part) integral with at least one adjustable fixed point of one of the said levers and defining a motion, assigned with a certain amount of freedom, between the said fixed point and the other lever.

Therefore the mere selection of the said fixed point defines the reduction ratio between the driving rotary motion and the receiving translation motion.

A very valuable application of this device is its use for the mechanical coupling between the translation-guided, driving rod of the servomotor of a fluid flow rate regulating valve and the driven rod of its trap or poppet.

As a matter of fact, in a widely used valve type, the driving rod of the servomotor and the receiving rod of the trap are parallel with one another and are both connected with a sole, lever-forming, control arm ensuring the amplification of the transmitted force.

This arm is mounted in nearly perpendicular relationship with the common direction of both rods and is pivoted around a fixed point near the hinged zone of the receiving rod.

It is, therefore, advisable to equip the above-mentioned type of valve with the coupling device according to the present invention. According to a preferred embodiment, both levers are mounted in a direction which is nearly perpendicular to that of the motion of both rods. This construction enables obtaining a regulating valve with adjustable nominal flow rate factor whose value is defined by an abutment of the piston of the servomotor inside its chamber and, therefore, with a very high safety factor.

Besides this, it offers, over the existing valves with adjustable nominal factor, the advantages, of being of much simpler construction, of requiring less space because of the collinearity between the servomotor, the valve body and possibly (as hereafter explained) the positioner, and of being easily adaptable, without major alteration, to the existing types of valves.

According to an advantageous variant of the coupling process of the invention, a fixed point (called connection point) is selected on one of the two levers and then, in the course of the movement of the two levers, this point is compelled to follow a path which is interdependent with the other lever.

More specifically, according to a variant recommended by the invention, the driving and receiving levers are both provided with an elongated passage. An axle for the transmission of the movement between the two levers extends through the elongated passage of each lever. This axle is provided with a blocking system of the locking and unlocking type which fixes it in a determined position in relation with one of the two levers. The passage of the other lever, besides, has a width equal to the cross-section of the said transmission axle so that the free portion of this transmission axle can slide without clearance inside this passage.

It is therefore possible to operate a stepless adjustment of the reduction ratio (and, more particularly, of the nominal flow rate factor of a valve) by a mere displacement of the position of the axle along the lever to which it is bound.

It is besides recommended that the passage of that lever, along which the axle of transmission of movement slides freely, be rectilinear. Moreover, both the driving and receiving levers will preferably be straight and nearly parallel to one another during their movement. This construction ensures a quasi-linear demultiplication between the driving and receiving motions. This feature is much appreciated in the case of a regulating valve as it ensures a proportionality between the control signal and the position of the trap.

Similarly, the invention locates each of the axes of rotation of both levers in the vicinity of the receiving rod in order to increase the reduction ratio between the driving motion and the receiving motion and, therefore, the sensitivity of the apparatus.

Besides, according to a very useful variant of application, one at least of the two levers is provided with an elongated graduated scale in front of which an adjusting mark, interdependent with the axle of transmission of the movement between the two levers, is moved so as to enable a stepless and scaled adjustment of the demultiplication of the coupling. Preferably, the elongated scales of the flow rate regulating valves will be graduated in percentages of the maximum nominal flow rate of the valve.

Finally, in case the regulating apparatus, and especially the regulating valve, is provided with a positioner bound to the frame of the apparatus for establishing a bond of dependency between the control signal and the state of the regulation system by seizing the movement of this system through a feed-back spring, the invention advises to bind the end of this spring to the driving lever of the coupling device.

The scaling of the positioner is thus made independent from the adjustment of the nominal flow rate factor and the linearity between the action of the positioner and that of the control signal is mainained.

Other characteristics and advantages of the invention will appear from the following description and appended related drawings, the said description and drawings being submitted as non-limiting examples.

DESCRIPTION OF THE PREFERRED EMBODIMENTS

Figure 1:
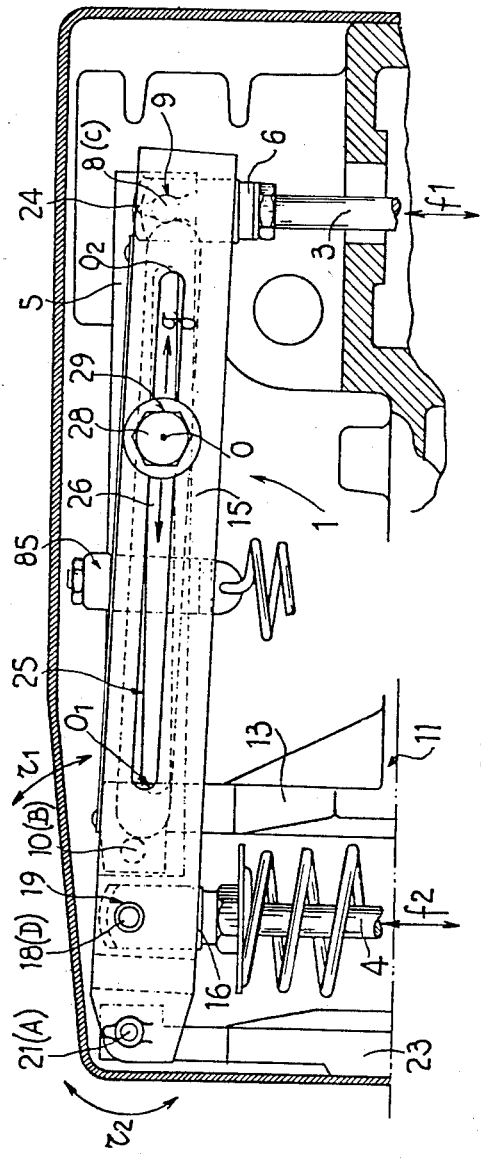
FIG. 1 is a front view of a mechanical coupling device with adjustable demultiplication between two translation motions, according to the invention.

FIG. 1 shows a device 1, according to the invention, for establishing a mechanical coupling between two parallel translation motions, i.e. a driving motion f1 and a receiving motion f2, embodied by the driving rod 3 and the receiving rod 4 respectively.

This device comprises a driving lever 5, connected to the driving rod 3 by a first fork-shaped joint 6 prolonging rod 3 and pivoted on an axle 8 (integral with lever 5 and driven inside a recess 9 of joint 6 provided for this purpose), and hinged, for rotation along double arrow r1, to a first fixed axis or axle 10 bound to, and raised from frame 11 of the device 1 by a bracket 13.

A receiving lever 15, nearly parallel to driving lever 5, and which is, similarly, connected to the receiving rod 4 by a second fork-shaped joint 16 prolonging rod 4 and pivoted on an axle 18 (integral with lever 15 and driven inside a transverse recess 19 of joint 16) and hinged, for rotation along double arrow r2, to a second fixed axis or axle 21 bound to, and raised from frame 11 of the device 1 by a bracket 23.

The ends of axles 8, 10, 18, and 21 bear clips 24 for quick dismounting of levers 5 and 15.

Levers 5 and 15 are each provided with an elongated slot, respectively 25 and 26. Through both slots passes an adjustable axle 28 for the transmission of the rotation motions r1 and r2 between both levers 5 and 15.

A blocking system 29, of the locking-unlocking bolt and nut type, enables displacing axle 28 along double arrow g over the length of slot 26 before fixing it relatively to lever 15.

Figure 2:
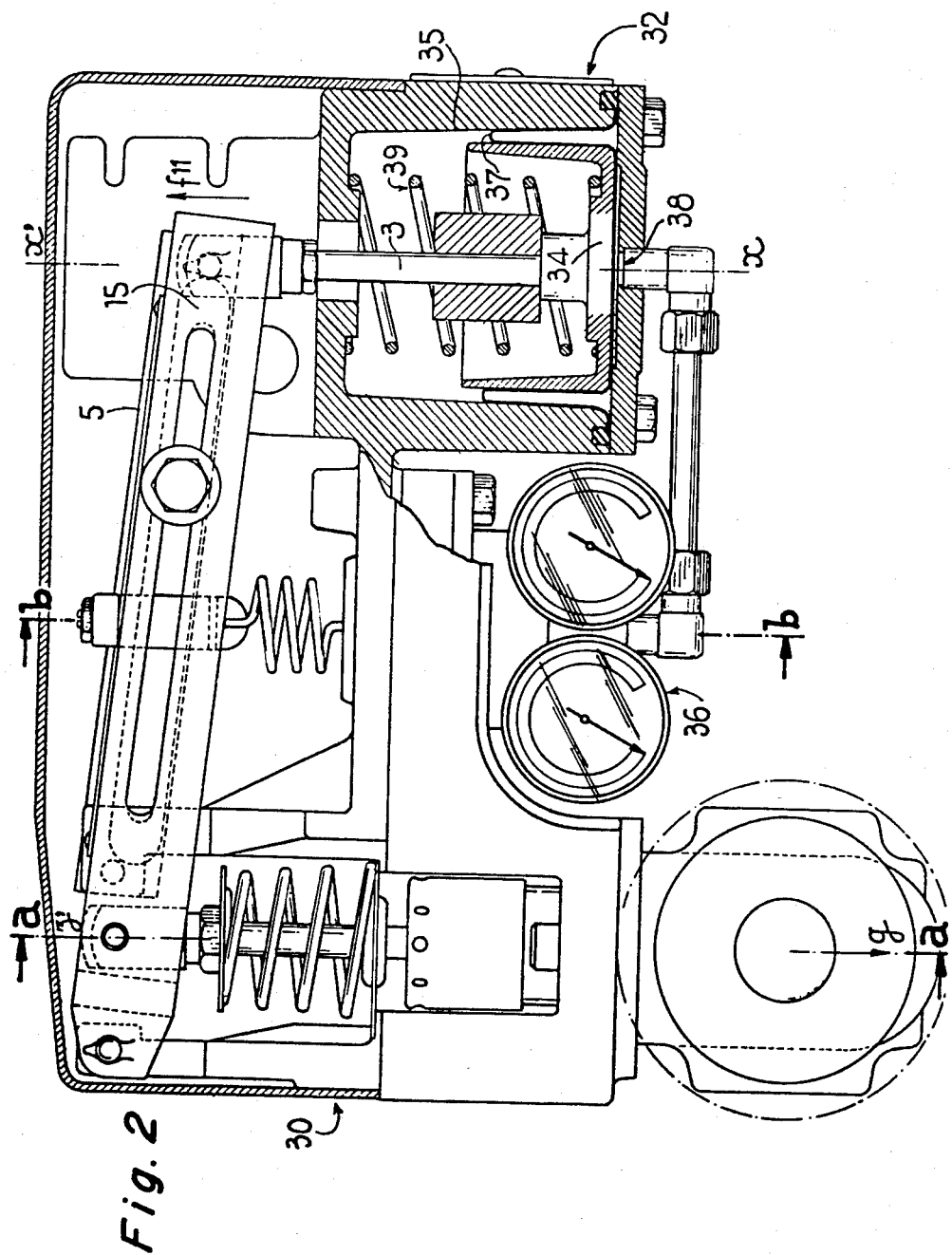
FIG. 2 is a part-sectional view of a fluid flow rate regulating valve with stepless adjustment of the flow rate factor, equipped, for this purpose, with the coupling device of FIG. 1.

FIG. 2 shows a conventional valve for the regulation of the flow rate of a fluid, 30. This valve is controlled by a servomotor 32 mainly composed of a piston 34 sliding vertically inside a cylindrical chamber 35 and wrapped up in an unrollable membrane for integrating the pressure effort generated by the positioner 36 and transmitted, through air inlet 38, to the lower part of chamber 35.

The action of the servomotor is transmitted to driving rod 3 with which it is coupled. This action is opposed by a spring 39 topping piston 34 inside chamber 35 on the face of the piston remote from membrane 37. An increase of inlet pressure, therefore, entails an upward translation of driving rod 3 in the direction of arrow f11 along axis x—x' and vice-versa.

Figure 3:
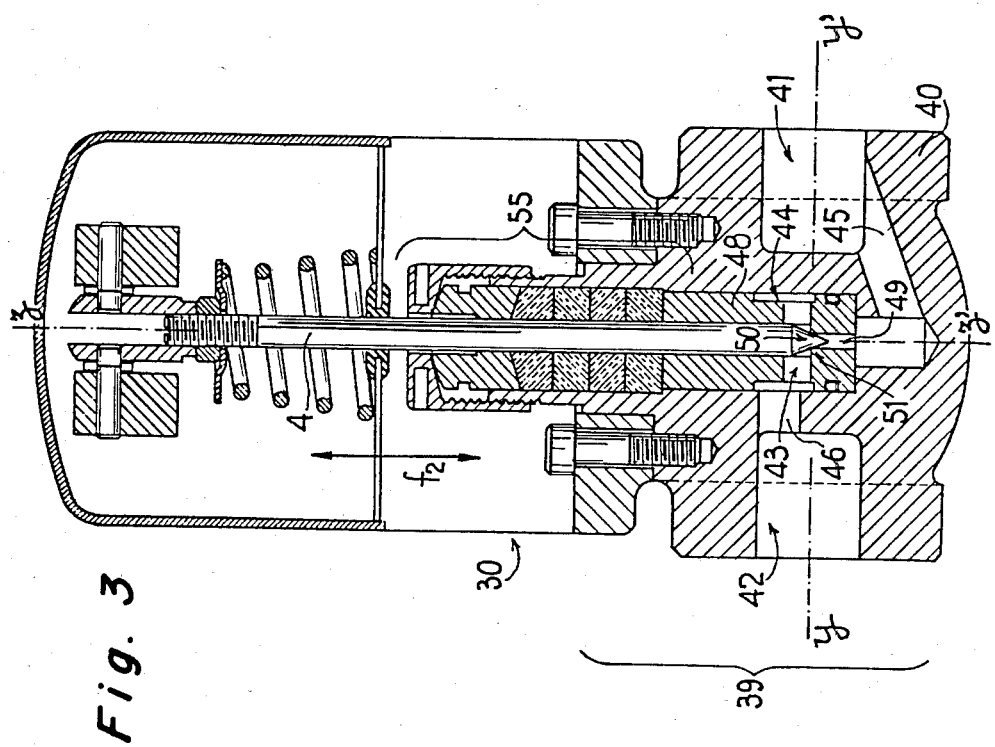
FIG. 3 is a vertical section, along line a—a of FIG. 2, showing the adjustment trap of the fluid passage section of the valve of FIG. 2.

FIG. 3 shows the adjustable obturation system 39 for the fluid flow rate inside valve 30. It comprises, conventionally a body 40 provided with two bores 41 and 42, bored along axis y—y', for connection with the ends of two piping sections between which valve 30 must be mounted; a blind recess 44, cut through body 40 along axis z—z' perpendicular to axis y—y' and communicating with the two bores 41 and 42 through drillings 45 and 46 for letting fluid flow from one bore to the other; an annular seat 48 inserted without clearance inside recess 44 so as to form a lateral gap 43 with drilling 46 and communicating with drilling 45 through its central recess 49; a valve-trap or valve-plug 50 cooperating with the operative part of seat 48 for varying the obturation of the communication between drillings 45 and 46 so as to vary the flow rate factor of the valve; a receiving rod 4 topping trap 50 for transmitting the translation motions; and finally, several ancillary elements 55 for accurately guiding receiving rod 4 in its vertical translation along axis z—z' in the directions of double arrow f2, and for establishing a tight seal between body 40, trap 50, seat 48 and the exterior.

The mode of operation of the mechanical coupling device 1 according to the invention will now be described with reference to FIGS. 1 and 2.

It must first be noted that the translation motion (according to f1) controlling driving rod 3 is first transformed at point C, through hinged joint 8, into a first rotary motion (according to r1) around fixed axle 10 located at point B, embodied by driving lever 5.

Then this first rotary (driving) motion around point B is coupled with a second rotary (receiving) motion around fixed point A, embodied by receiving lever 15, the said coupling being effected through adjustable axle 28 located at point O and integral with lever 15.

The receiving rotary motion is transmitted at point D, through hinged joint 18, to receiving rod 4 which is translating along f2 so as to operate trap 50.

Therefore, since levers 5 and 15 have great dimensions relatively to the distance between their points of rotation A and B, and the rotation of each of these levers has a small amplitude, a geometric computation shows that:

$$\frac{BO}{AO} = \frac{\alpha B}{\alpha A} = \frac{\frac{drv - r}{BC}}{\frac{rcv - r}{AD}} =$$

$$\frac{drv - r}{rcv - r} \cdot \frac{AD}{BC} = K \cdot \frac{drv - r}{rcv - r}$$

where xB and xA are the angles traversed, respectively, by driving lever 5 and receiving lever 15 during their rotations; drv-r and rcv-r are, respectively, the translation amplitude of driving rod and receiving rod during their motions; and $$K = \frac{AD}{BC}$$

is a characteristic constant of the device, and therefore of the valve, which depends only on the respective position of points A, B, C and D.

Therefore an adjustment of O, i.e. of the position of axle 28 relatively to lever 5 enables operating a stepless variation of the reduction ratio of the system from the value $$d1 = \frac{BO1}{AO1}$$

to the value $$d2 = \frac{BO2}{AO2} \text{ or, } d1 < d2.$$

Also a quasi-linear relation (with adjustable reduction ratio) between each of the motions f1, r1, r2, f2, is essentially obtained from the geometric characteristics inherent to device 1, i.e.: the length of levers 5 and 15; the quasi-parallelism of these levers 5 and 15 perpendicularly to the direction of translation of rods 3 and 4, and the rectilinear extensions of slot 25 along lever 5.

The coupling device 1 offers the advantages of being simple and inexpensive to construct as it only requires the fabrication of levers 5 and 15 which may be manufactured by press drawing, requires less space, and this is in one direction only as a consequence of the collinearity it enables to establish between direction x—x' of the servomotor 32 and direction y—y' of the receiving system 39.

Figure 4:
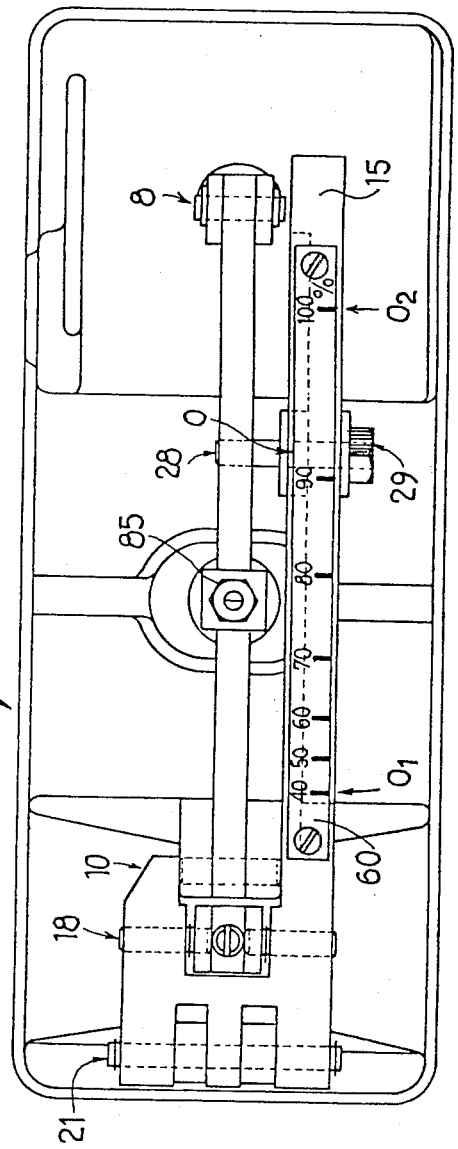
FIG. 4 is a top view of the coupling device of FIG. 1 equipping the regulating valve of FIG. 2.

A particularly advantageous embodiment of the invention is shown in FIG. 4, which offers a top view of the valve of FIG. 2.

This FIG. 4 shows that a graduated elongated scale 60 covers the receiving lever 15. This scale is graduated from 40 percent to 100 percent of the maximum nominal flow rate of the valve.

The minimum percentage is placed in front of position 01 of the adjustable lever for which the reduction ratio between the translation of the driving rod 3 and the correlative translation of the receiving rod 4 is maximum, i.e. in front of the lowest position of the receiving rod, and therefore of the valve-trap, and thus corresponds to the minimum FRF of valve 30. Conversely, the maximum percentage, i.e. 100 percent, is placed in front of position 02 of the adjustable lever for which the reduction ratio between the two motions is minimum and corresponds to the maximum FRF of the valve.

This embodiment provides an easy manner to adjust the variation range of the FRF of valve 30 and, more especially, its nominal FRF by displacement of the axle 28 along lever 15 up to its locking at point O corresponding to the requested nominal FRF marked on scale 60.

Contrary to the regulating valve of the prior art described in the introduction of this description, the valve 30 according to the present invention enables an accurate adjustment of the nominal FRF on account of the great length of displacement 01-02 of the adjustable axle 28.

Figure 5:
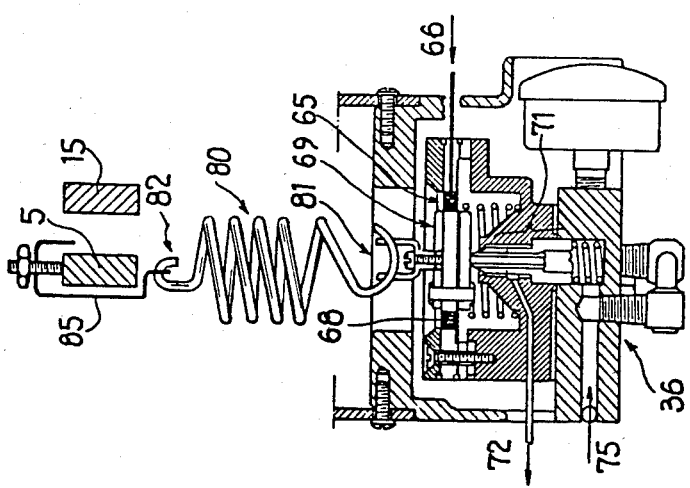
FIG. 5 is a vertical section, along line b—b of FIG. 2, showing the positioner equipping the regulating valve of FIG. 2 and, particularly, the mode of location of its feed-back spring recommended by the invention.

FIG. 5 shows a section of the pneumatic positioner 36 of valve 30. This positioner comprises a chamber 65 for the admission of the control signal 66, this chamber being defined by two membranes 68 and being surrounded by a moving assembly 69, and a trap-and-slide unit 71 delivering the control pressure 72 of the servomotor, this unit being fed with the supply pressure 75.

Generally speaking, the operation of the positioner consists in correlating the tension force of a spring 80 (called feedback spring) whose length depends on the position of trap 50, with the force exerted on membranes 68 by the control signal.

As shown on FIG. 5, one end 81 of spring 80 is fixed to the moving assembly 69 of positioner 36, and the other end 82 of this spring to the driving lever 5 of device 1 through a hanging system 85.

The action of the positioner is thus independent from the adjusted level of the FRF.

The possibilities of application of the process of the present invention are, of course, not limited to the described type of valve and it is thus possible to adapt the device 1 without essential modification to a valve of the type of valve 30 but of the "no-air closing" type (whereas valve 30 is of the "no-air opening" type) by mere inversion of its position in relation to piston 34 and, possibly, by changing the resistance of spring 39 or, similarly, to a valve whose positioner 36 is equipped with a feedback spring 80 acting in compression instead of extension.

Still more generally speaking, the device 1 according to the present invention is applicable to any system (and in particular to a system for the regulation of a parameter) in which a translation movement and rotation movement or two translation movements must be mechanically coupled according to a variable reduction ratio.

What is claimed is:

1. In a valve assembly combination, including a valve positioner responsive to a measured condition for emitting a control signal, a valve actuator having displaceable output means operable to a position setting by the control signal of said valve positioner, and a control valve having settable input means operably adjustable for regulating fluid flow through the valve in correlation with the position setting of said valve actuator output means, a coupling linkage forming a driving connection between said valve actuator output means and the settable input means of said control valve enabling adjustment of the flow coefficient of the control valve independent of the signal emitted by said valve positioner, said coupling linkage comprising in combination:

(a) an elongated first arm extending between a first fixed pivot axis and a connection with the displaceable output means of said valve actuator, said first arm being subject to arcuate displacement about said first pivot axis concomitantly in response to a change incurred in the position setting of the output means of said valve actuator;

(b) an elongated second arm extending between a second fixed pivot axis and a connection with the settable input means of said control valve, said second arm being adapted when actuated to incur an arcuate displacement about said second pivot axis while concomitantly adjusting the settable input means of said control valve; and (c) connection means joining said first and second arms at a predetermined location to afford relative pivotal motion of said arms thereat and effective when said first arm is arcuately displaced about said first pivot axis to actuate displacement of said second arm about said second pivot axis, said connection means being adjustably presettable to said predetermined location at which the relative amplitudes between the position setting of said actuator output means and the actuated input of said second arm to the settable input means of said control valve is effected for an intended regulation of flow through said control valve.

2. In a valve assembly according to claim 1 in which said first and second arms are arranged extending generally parallel to each other with at least portions of each being coextensive, and said connection means includes fastener means extending transversely between the coextensive portions of said arms and is adjustably presettable to a location longitudinally thereof.

3. In a valve assembly according to claim 2 in which each of said arms includes a longitudinal slot through the respective coextensive portion thereof, and said fastener means extends transversely through said slots for affording a pivotal connection therebetween.

4. In a valve assembly according to claims 1 or 3 in which the output means of said actuator and the flow settable input means of said control valve each comprise an operably displaceable rod of a substantially straight configuration with the rods being arranged for displacement substantially parallel to each other.

5. In a valve assembly according to claim 4, including graduated scale means providing an indicia on one of said arms for presettably determining the adjustment location of said connection means in correlation with the ratio for the relative amplitude setting of said control valve sought to be effected.

* * * * *